United States Patent [19]
Bykowski et al.

[11] 3,979,289
[45] Sept. 7, 1976

[54] FILTRATION METHOD

[75] Inventors: Michael J. Bykowski, Trenton; Lloyd Ewing, Bayside, both of Wis.

[73] Assignee: Water Pollution Control Corporation, Milwaukee, Wis.

[22] Filed: Aug. 23, 1974

[21] Appl. No.: 500,213

Related U.S. Application Data

[63] Continuation of Ser. No. 304,886, Nov. 8, 1972, abandoned.

[52] U.S. Cl. ................................ 210/79; 210/403
[51] Int. Cl.² ........................................ B01D 23/24
[58] Field of Search ............... 210/59, 65, 67, 77, 210/79, 82, 403; 209/380; 134/34

[56] References Cited
UNITED STATES PATENTS

| | | | |
|---|---|---|---|
| 869,720 | 10/1907 | Mathias | 210/403 X |
| 1,531,482 | 3/1925 | Haug | 210/403 |
| 1,717,604 | 6/1929 | Haug et al. | 210/403 |
| 2,178,701 | 11/1939 | Petre | 134/34 |
| 3,117,927 | 1/1964 | Smith | 210/403 X |
| 3,221,886 | 12/1965 | Lamort | 209/380 |
| 3,445,286 | 5/1969 | Smith, Jr. | 134/34 |
| 3,542,594 | 11/1970 | Smith et al. | 134/34 X |
| 3,589,521 | 6/1971 | Richter | 209/380 |
| 3,617,441 | 11/1971 | Farrell | 134/34 |

OTHER PUBLICATIONS

Process Design Manual for Suspended Solids Removal, Burns and Roe, Inc., 700 Kinderkamack Road, Oradell, New Jersey, 07649; for Environmental Protection Agency, Oct. 1971.

"Rotary-Gravity Type Screening Machines", Industrial Water and Wastes, Nov.-Dec., 1962, Scranton Publishing Co., Chicago.

*Primary Examiner*—Theodore A. Granger
*Attorney, Agent, or Firm*—Pollock, Vande Sande & Priddy

[57] ABSTRACT

Filtration in an internal rotary filter system is improved by externally impacting the filter screen as it rotates with a programmed spray of liquid that is varied from a relatively low to a relatively high pressure. In certain instances, this programmed spray is controlled by an electric timer circuit so arranged that the high pressure spray is on for a period of time which does not too unduly burden the system with fluid, but which is sufficient period of time to prevent slime formation on the screen. This can for instance keep the screen free of slime when no germicidal agent (e.g. $Cl_2$) is employed.

32 Claims, 8 Drawing Figures

FILTRATION METHOD

This application is a continuation of Ser. No. 304,886, Nov. 8, 1972, now abandoned.

This application relates to the separation of solids from liquids by filtration, and apparatus for effecting this result. More particularly, this invention relates to the separation of solids from liquids, particularly for the purification of water, by using an internal rotary filter system and an automating mechanism therefor.

Internal rotary filter systems are known in the art. Generally speaking they comprise a tub arrangement in which there is presented a rotatable filter drum. The drum may be made up of end walls and a connecting, open cylinder on which is secured a filter screen.

Liquid containing solids, as for example sewage waste, is supplied by way of a conduit to the internal portion of the drum. As the drum rotates it separates the solids from the liquid by causing the solids to collect on the internal surface of the rotating screen while the "purified" liquid drains through the screen and into the surrounding tub. The solids, such as the sludge obtained from waste disposal, is lifted by the screen to a point, e.g. about the apex of rotation, at which point a fluid spray may be caused to impinge upon an unsubmerged portion of the screen from an external source, thus back-flushing and dislodging the solids from the interior of the screen. In order to collect the separated solids there is provided immediately below the dislodgement point and internally of the drum, a trough arrangement which catches the dislodged solids and transmits them through a conduit out of the drum to a collection facility. The purified liquid in the tub is usually caused to overflow a spillway of preselected height into a conduit which leads to a disposal area such as a stream, lake, or further processing facility.

Internal rotary filters, e.g. Microscreens, generally exhibit two major operating problems. Firstly, dislodgement of the solids from the internal portion of the filtering screen is often inadequate. This causes some of the solids to be carried by the screen past the dislodgement point and back into the waste liquid pool being treated which, in turn, tends to concentrate the liquid and clog the screen. The efficiency of the filtration process and the amount of liquid that can be treated is thereby diminished.

Secondly, there is the problem of fouling of the screen by tenaciously adherent substances such as grease, surface-active materials and slime, including organic and/or inorganic slimes. Such a problem is, of course, not experienced when one is filtering a relatively pure liquid-solid mixture, e.g. one that includes little or no bacteria, fungus, materials required for the metabolic growth of microorganisms, and other slime-forming ingredients. On the other hand, it has been found that when one seeks to treat contaminated liquid-solid mixtures such as sewage waste, the "slime" problem becomes a significant deterrent to effective filtration due to the clogging of the screen. Since Microscreens are being increasingly relied upon for at least one step in the process of sewage waste treatment, this slime presents a significant problem.

Several attempts have been made in the prior art to improve solids dislodgement from the rotating screen. Such attempts have usually depended on a mechanical means for moving the solids such as an internal scraper blade, vibration of the screen, or the like, or on a fluid impacting system such as a liquid, air or steam spray, or on chemical cleaners, including bleaches, surfactants and germicides. Combinations of these have also been proposed.

Mechanical means in this respect, are often unsatisfactory because of the nature of the screens employed and because of the need for exact alignment of the scraper, etc. in order to achieve the desired result.

When employing fluid contacting or impacting techniques, it is known that the mere use of a spray is not always the most efficient way to clean the screen. Thus, the art has devised various means for impacting the screen with a spray so as to better dislodge the solids. They have, for example, designed high pressure nozzles, used larger amounts of fluid, and either pulsated the fluid in an on-off mode at any particular point along the screen's length.

While these fluid flush impacting techniques have achieved some modicum of success they are not entirely satisfactory. Firstly, achievement of sufficient pressures without excessive use of water in order to dislodge the solids, and particularly waste sludge, from the screen by constant pressure spray is not always possible with conventional nozzles available to the art. On the other hand, by going to higher pressures through the use of more liquid (air usually being unsatisfactory) excessive liquid is injected through the screen and into the filtering zone or solids collecting trough thus putting an additional load on the system which receives this stream. Furthermore, on-off pulsating of the liquid, either by way of an actual timer-pump arrangement which turns the water on and off, or by reciprocating the spray nozzles across the face of the screen, has proved relatively unsatisfactory because a trade-off must be made between the length of the "off" mode and the amount of solids dislodged.

The existence of general dissatisfaction with mechanical and fluid impact cleaning methods is evidenced by the strong dependancy on the use of chemical cleaners which has developed in the art. Thus, for instance chlorine is used continuously in some plants and intermittently in others to control slime. However, the use of such chemicals introduces a degree of complexity and additional expense into the process, and in some instances involve shut-down of the filter. Certain of these agents have a corrosive effect on both metallic and non-metallic filter cloth and appurtenant structure. More importantly, however, many chemical cleaners are themselves pollutants which can enter rivers and other bodies of water with the sewage treatment plant effluent.

It is, therefore, evident from the above that there exists a definite need in the art for an improved filtration technique and/or apparatus which would increase the efficiency of the separation process and solids removal and, at the same time, lessen or eliminate dependency on chemical cleaning agents.

It is a purpose of this invention to fulfill this need as well as other needs which will become more apparent to the skilled artisan once given the following detailed disclosure of this invention.

Generally speaking, this invention achieves its avowed purpose by a method which comprises operating the above-described impacting liquid spray first at a relatively low pressure and then at a relatively high pressure, the periods of time at which the liquid spray is held at low pressure and high pressure being, in combination, sufficient to dislodge substantially all of the solids on the internal portion of the screen, but insufficiently to unduly load the system with liquid. Stated in another way, this invention constitutes an improvement upon the process of separating a liquid from solids in an admixture of the two by using an internal rotary filter system comprised of a rotatable hollow drum defining therewithin a filter zone, the filter zone communicating with a liquid collection zone external to the drum through a filter medium located on the drum, and wherein separation is accomplished by presenting the admixture in the filter zone, rotating the drum and causing solids to adhere to the internal portion of the filter medium while causing liquid to flow through the filter medium to said liquid collection zone and wherein the separated solids are collected by contacting the filter medium with a fluid to dislodge the solids from the medium and cause them to collect in a solids collection zone separate from the liquid collection zone, the improvement of this invention comprising contacting the filter medium with the fluid cycled at at least two different finite pressures such that the combination of pressures and time interval of each within the cycle removes substantially all solids from the filter medium without overburdening the system with liquid.

While this invention contemplates the cycling of the fluid through more than two preselected finite pressures, it is preferred for the purposes of this invention that for the majority of the time in the cleaning cycle the system is operating at two different pressures, one pressure in a relatively high range the other pressure in a relatively low range. By employing such a system, in the preferred embodiments of this invention, the combination of pressures and time interval of each is sufficient to cause a more efficient dislodgement and separation of the solids than if any of the pressures were used alone and pulsated in an on-off mode or if the fluid were applied at any of the pressures at a constant rate, as heretofore attempted by the prior art. In certain further preferred embodiments of the invention, the relative levels and time relationships of the low and high pressure segments of the operating cycle are preselected to reduce or eliminate the slime problem, while controlling the use of wash water and power (for the pump which feeds the spray nozzles). In other preferred embodiments, the liquid apray is taken from the purified liquid in the tub whcih has been filtered through the rotary filter system. This liquid can nevertheless contain solids which can clog the spray nozzles. In further preferred embodiments, so-called "self-cleaning" nozzles are employed to spray the liquid against the screen in combination with control means to provide a short period of flow through the nozzles at a still lower pressure to purge the nozzles of any contaminating solids which may have collected therein.

The processes of this invention differ dramatically from those of the prior art both in operation and effect. In operating, the prior art, when it employed pulsation, provided only limited control over wash water utilization when operated at its maximum slime removal capacity. In addition, the various mechanisms employed to reciprocate the spray nozzles (if this is how pulsation is achieved) are often complex, thus adding an expense and a potential maintenance item to the system as a whole. In contrast, the processes of this invention are simple to operate, do not overload the system with fluid and yet effectively remove solids from the screen — and in particular embodiments eliminate slime without the need for germicides.

In order to most efficiently carry out the above-described processes of this invention, this invention contemplates an improvement upon the basic apparatus heretofore employed in the art as described hereinabove which improvement generally comprises using as the means for applying the fluid to the filtering medium a means which includes a pressure controlling means for applying the fluid in a cycled fashion at pressures within at least two different finite pressure ranges such that the combination of pressures and time interval of each within the cycle are capable of removing substantially all solids from the filter medium without overburdening the system with fluid. In certain preferred aspects of this invention, the pressure controlling means is also capable of applying fluid in a cycled fashion so as to prevent any substantially amount of slime from forming on said fluid medium without the use of a germicide. In other preferred forms of this invention, the pressure controlling means also includes a pump means capable of performing at at least two different speeds and a timer means for controlling in said cycled fashion, the speed at which the pump means operates and thus the pressure at which the fluid is applied to the filter medium.

In other preferred forms of this invention the timer means includes a control means to provide a short period of flow through the nozzles at a still lower pressure, preferably between a change-over from either high to low, or low to high pressure. Also, the fluid applying means includes self-purging nozzles located externally to the drum, and usually at the apex of rotation of the drum, which are capable of purging themselves of contaminating solids during the aforesaid short period of flow.

This invention will now be described by reference to certain embodiments thereof and illustrations in connection therewith wherein:

Figure 1:
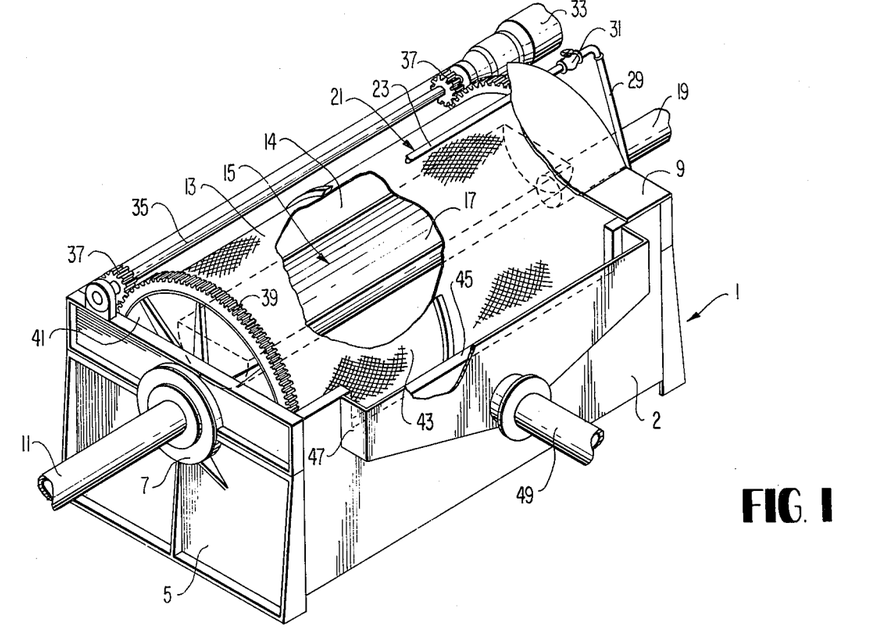
FIG. 1 is a partially sectioned perspective view of an internal rotary filter system employed in accordance with this invention.
Figure 2:
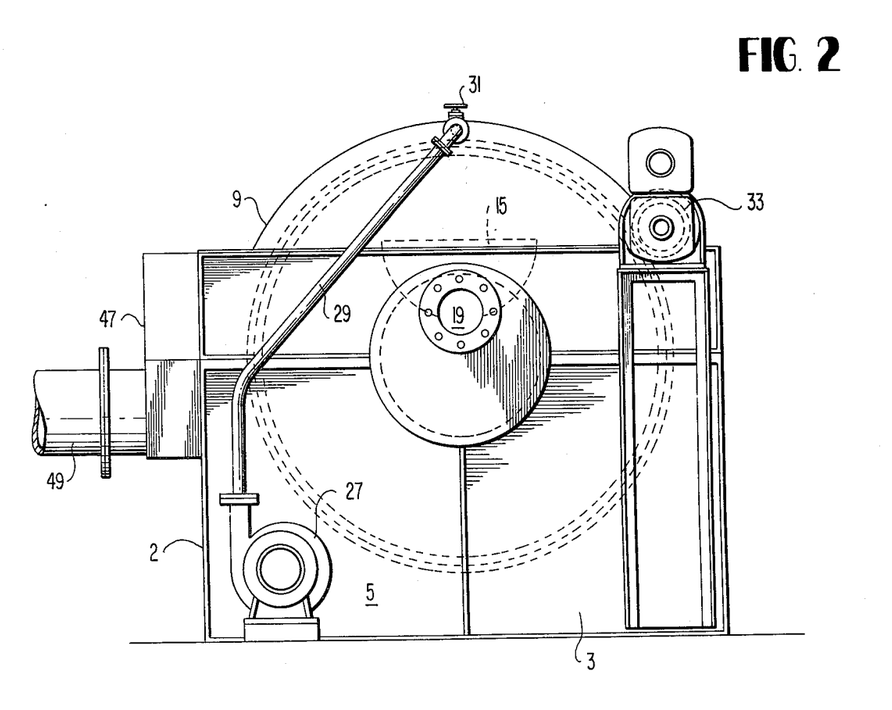
FIG. 2 is an end plan view of the system of FIG. 1.

Referring now to FIGS. 1 – 7 there is illustrated what may be called a basically conventional internal rotary filter system 1 adapted to be operated in accordance with this invention. Such a system generally comprises a tank or tub means 2 which forms in its internal portion a pool or reservoir 3 (FIG. 2). Located in end walls 5 of tank means 2 are drum axle bearing means 7 which form a stationery retaining means about which the filtration drum 13 (hereinafter described) may rotate. On top of tank 2 there is provided a hood or lid 9 which may extend over the entire top portion of the system so as to prevent splattering of fluid and solids from within the system.

Located within the front wall 5 of tank 2 is inlet conduit 11 which communicates between a point external of the system to the internal filtration zone 14 of drum 13. Located within drum 13 and juxtapositioned longitudinally along its axis and immediately below its highest point or apex of rotation, generally illustrated as at point X (see FIG. 4), is sludge collecting conduit 15. It consists of a collecting trough 17 and a conduit 19 which connects the trough through the rear wall 5 with a point external to the system.

Located at about the apex of rotation X and internally of hood 9 are spray means 21. Spray means 21 may assume any conventional configuration which generally would comprise fluid conduit 23 and a plurality of axially spaced spray nozzles 25. While nozzles 25 may be any conventional nozzle currently employed in the art, it is particularly preferred for the purposes of this invention to employ nozzles of the self-purging type such s those produced by Lodding Engineering Corporation of Auburn, Massachusetts. Such nozzles are often known as "self-cleaning showers" and generally comprise a spring actuated plunger which closes down the orifice to form a spray when water pressure is applied behind the plunger. When water pressure is eliminated or reduced, such as by turning off the water, the plunger retracts and the nozzle opens thus purging it.

Figure 3:
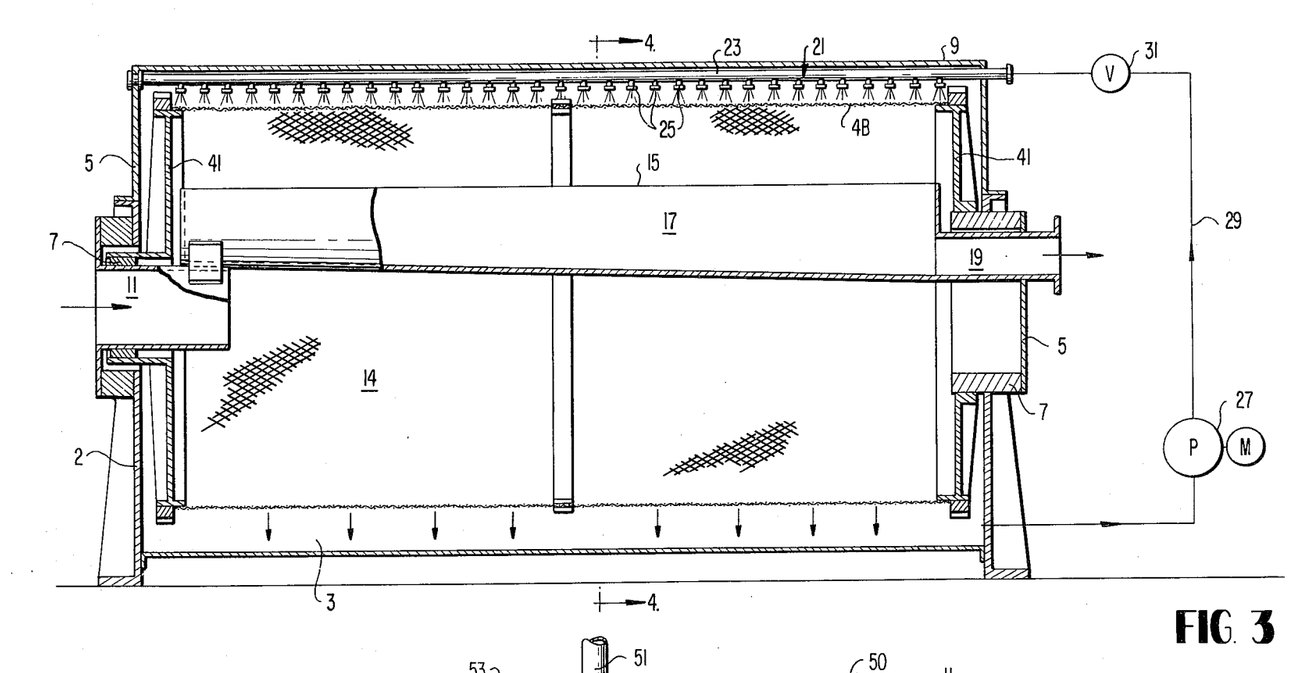
FIG. 3 is a partially sectioned side plan view of the system of FIG. 1.

While back flush fluid (e.g. water) may be provided by a source external to the system, it is preferred as illustrated in FIGS. 1–3 to supply this back flush fluid by means of a pump 27 which draws, for its source of fluid, from reservoir 3 and which then sends this fluid under one of two pressures (as described hereinafter more fully) by way of conduit 29, fluid conduit 23 and nozzles 25 to the screen. In this respect, it is often convenient to provide a manual throttle valve 31 for manually adjusting the pressure to the nozzles 25.

For the purposes of this invention, pump 27 may be any conventional type such as a centrifugal pump. However, pump 27 must be capable of delivering back flush fluid to conduit 29 at, at least, two different pressures, one relatively lower than the other.

Filter drum 13 is rotatably driven by motor 33 which drives the drum 13 by way of rotating axle 35 linked to pinions 37 which are connectingly associated with gear wheels 39 on either end of drum 13.

Drum 13 is structurally sealed against fluid flow at its ends by walls 41 (FIG. 3) such that elimination of fluid therefrom, must be by way of filter screen 43. While filter screen 43 may be of any conventional design, depending on the type filter being employed, and the like, it is preferred for the purposes of this invention particularly when filtering activated sludge sewage treatment effluent, to use as the rotary screen, those microscreens described in copending application Ser. No. 273,079 filed July 19, 1972 and entitled ROTARY SEWAGE PLANT EFFLUENT FILTER, FILTER ELEMENT, AND METHOD OF MANUFACTURE, now abandoned. The entire disclosure of this copending application is incorporated herein by reference.

Generally speaking, such a microscreen comprises a perforate supporting member, filter cloth interwoven strands or filaments defining apertures therebetween, the apertures being smaller than the openings in the perforate supporting member and a locking layer for locking the cloth in engagement with the supporting member. In addition, the locking layer is usually formed of solid material which, at least prior to locking, is soft or softenable under conditions which do not distend or impair the material of the filter cloth and the locking layer has an outer portion fixedly secured to the supporting member and having an inner portion which includes integral extensions extending through and at least partially overlapping a sufficient number of the filaments or strands of the cloth to securely lock the cloth to the perforate supporting member.

Such microscreens are capable of reducing the suspended solids in the effluent of an activated sludge process in an efficient manner, for example from about 20 parts/million to about 10 parts/million. In addition, such microscreens are durable and exhibit high efficiency of filtration when employed in the techniques of this invention.

The metal and synthetic polymer microscreening cloths to which the present invention applies, are of many different weaves, including square weave, which is preferred, dutch weave, various modified square and dutch weaves, quill patterns, braided or basket weave and others. They may have openings of varying size, e.g. 5 to 100 microns.

Figure 4:
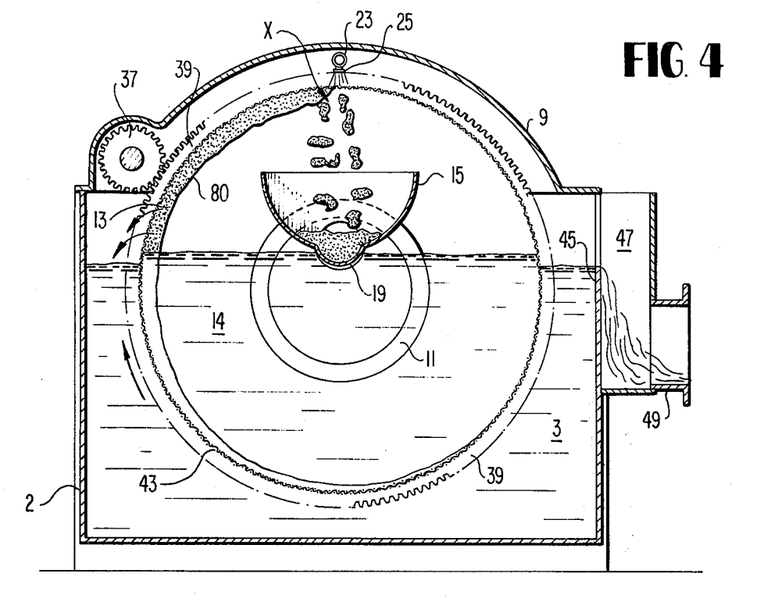
FIG. 4 is a sectionalized and view of the system as taken along line 4—4 of FIG. 3.

As best illustrated in FIGS. 1, 2 and 4, one of the side walls of tank 2 has therein a spill weir 45 for removing the filtered "purified" liquid from the system and sending it either to drain or to further processing. Such a spill weir communicates with a spill tank 47 and an outlet conduit 49.

Figure 5:
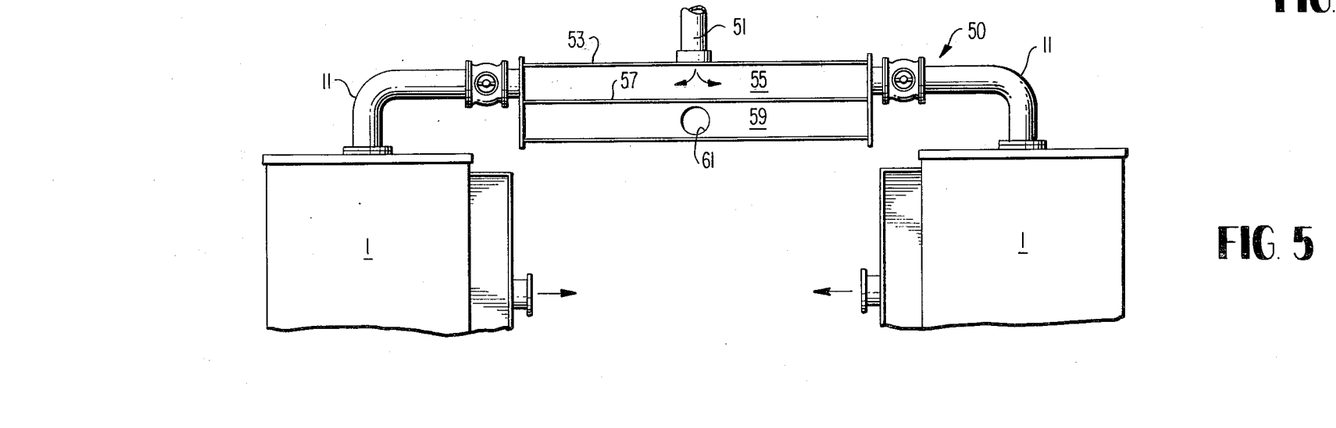
FIG. 5 illustrates a preferred inlet in accordance with the teachings of this invention.
Figure 6:
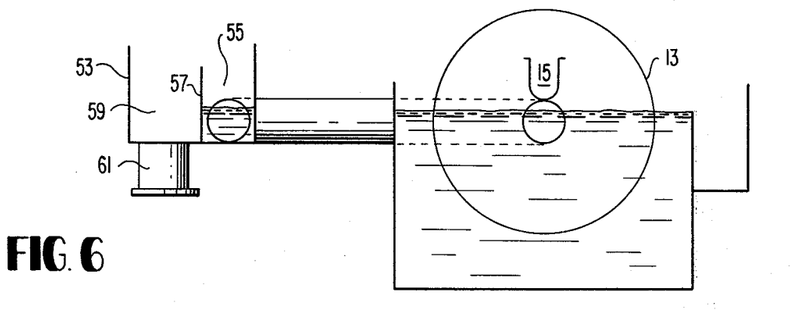
FIG. 6 is a partially sectioned side schematic view of FIG. 5 illustrating the device in operation at a relatively low level of filtration.
Figure 7:
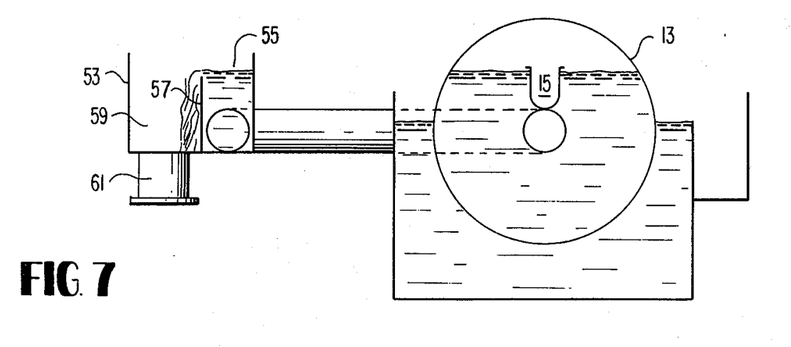
FIG. 7 is the same schematic view as FIG. 6 except that the liquid level is relatively high.

Referring now to FIGS. 5–7, there is illustrated a particularly preferred embodiment of this invention when the system is called upon to handle a large amount of liquid, such as sludge process effluent. Such an embodiment generally comprises at least two filtration systems 1 connected by way of a branched conduit arrangement generally indicated at 50. Conduit arrangement 50 generally comprises an inlet conduit 51 communicating with a divider-overflow tank 53 which separates the incoming liquid to be filtered and sends it to its respective systems 1.

Divider-overflow tank 53, in turn, as is best illustrated in FIGS. 6 and 7 comprises an inlet channel 55 which communicates by way of spill weir 57 with overflow channel 59 and drain conduit 61. Weir 57 is formed so as to provide a safety spill-over at a point just below the point at which liquid internal of drum 13 would begin to spill over into sludge collector 15. In this respect then FIG. 6 shows a normal operation while FIG. 7 illustrates what could happen if for example a large amount of sewage suddenly rushed into the system due to rain or the like. Rather then flooding the internal portion of the drum, the discharge of excess influent waste water over wier 57 allows the continuous operation of drum 13 in its normal mode (with its normal efficiency).

Figure 8:
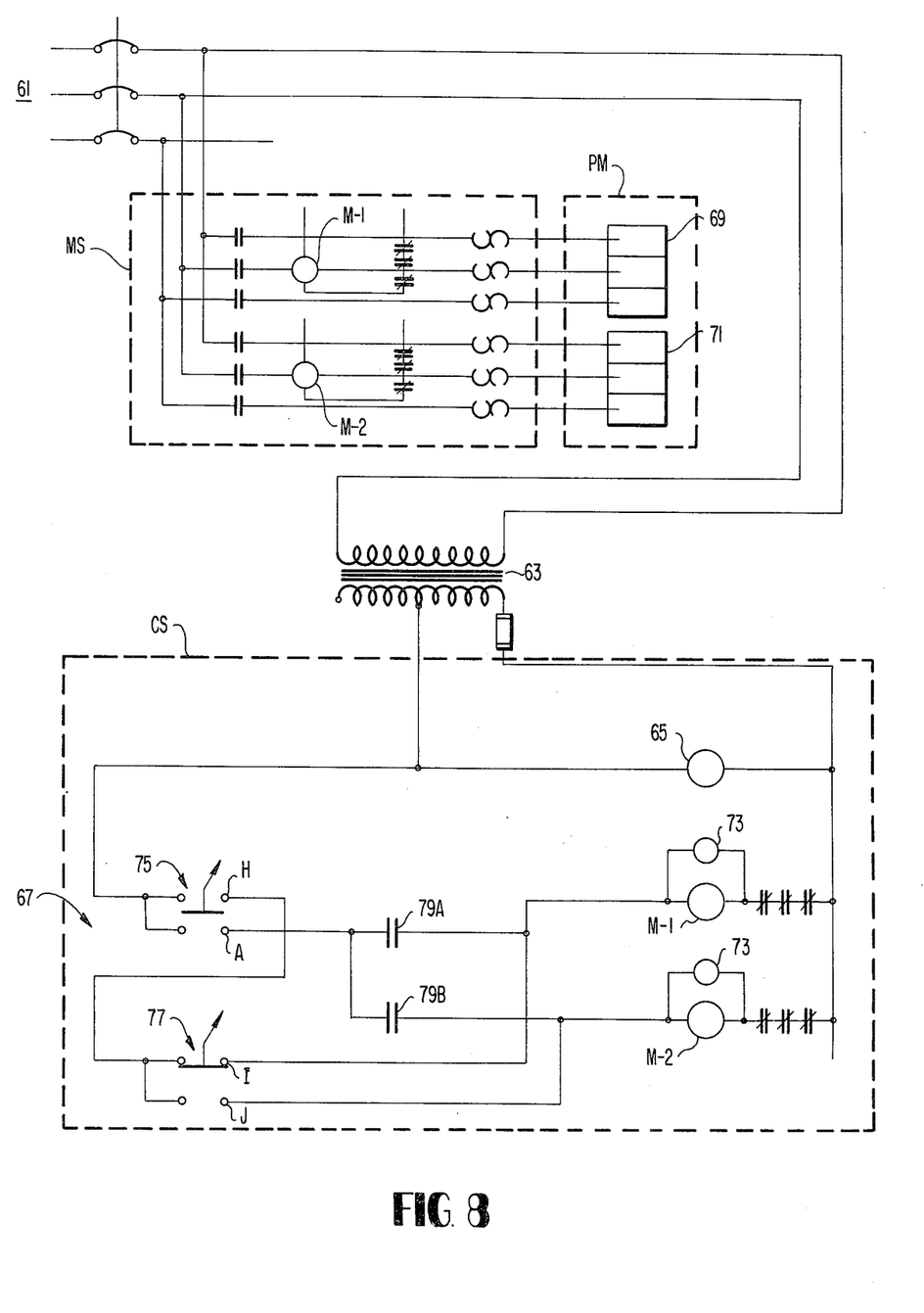
FIG. 8 is a schematic of a circuit for controlling pulsation in accordance with this invention.

FIG. 8 is a schematic of a circuit for manipulating pump 27 in its low-high pressure mode. In this respect, electrical energy is provided at source 61 to a conventional twospeed motor starter MS Starter coils M-1 and M-2 and their associated armatures (not shown) and contacts selectively energize the high speed windings 69 or low speed windings 71 of the two speed pump motor PM which is preferably of the variable speed, variable torque type. Control over starter coils M-1 and M-2 and selection of the high or low speed windings is attained by a control sub-circuit CS connected to power source 61 via conventional connections through stepdown transformer 63.

In control sub-circuit CS, switch means 67 includes a manual selection switch 75 which may be manually adjusted to manual setting H, open setting O or automatic setting A. When switch 75 is in position A, it connects one side each of contacts 79A and 79B with power supply transformer 63.

Also, there is a rotating timer drive motor 65 connected to transformer 63. This motor operates timer contacts 79A and 79B. This is accomplished for instance through any suitable mechanical arrangement such as a gear train and disc (not shown) driven by the timer motor, the disc having adjustably positionable cam means (not shown) on it and follower means (not shown) on the timer contacts 79A and 79B whereby the respective contacts can be held alternately open and closed for any desired portion of one revolution of the disc.

When contacts 79A are closed by rotation of timer drive motor 65, they energize high speed starter windings M-1 in motor starter circuit MS and cause pump motor PM to operate at high speed to produce the high pressure segment of system operation. When contacts 79B are closed by timer motor 65, they energize low speed starter windings M-2 and cause pump motor PM to operate at low speed, producing the low pressure segment of each operating cycle. Note that the starter windings M-1 and M-2 are illustrated twice in the wiring diagram to show their relationship to both the motor starter and control sub-circuit. Note also that indicators 73 (optional and mountable in the same control panel with switches 75 and 77 and timer motor 65) may be wired in parallel with starter coils M-1 and M-2, to show an operator which of them is energized.

When switch 75 is in manual operating position H, it connects to the transformer 63 one side each of the high speed contacts I and low speed contacts J of manual speed selector switch 77. When this switch is moved manually to positioin I, high speed starter coil M-1 is connected to the transformer through a current path which by-passes timer contacts 79A, thus manually operating pump motor PM at high speed. Similarly, moving switch 77 manually to position J by-passes contacts 79B and operates pump motor PM at low speed.

Based on this disclosure, those skilled in the art will readily substitute other equivalent timers and controls. Such timer mechanism is preferably, however, one which provides at least two speeds of operation as described hereinabove for pump 27. In addition, and preferably, the timer should be capable of providing a hiatus in the operation of the pump motor or at least a period of still lower pressure operation between the principal high and low pressure segments of the operating cycle to enable the self-cleaning shower nozzles to purge themselves of any contaminating solids as described hereinabove.

OPERATION

In operation, the actual pressures chosen for the low pressure and the high pressure segments of the operating cycle will be governed by various parameters in the system such as the type of liquid being filtered, the size of the filter, and the like. Functionally stated, however, the low pressure should be some definite finite pressure capable of removing and directing to the trough a substantial portion of the sludge presented under its spray.

Then, following application of this low pressure spray there should be provided, for a sufficient period of time within the cycle, a spray of liquid at a pressure above the low pressure sufficient to remove substantially all remaining sludge from the screen and preferably to eliminate any slime formation thereon either with a reduced amount or without the employment of chemical cleaners.

In general, there is a programmed operation in repetitive cycles. Each cycle includes a segment or period of operation at pressure(s) in the range of about 15 to 60 psig and a segment or period of operation at pressure(s) in the range of about 60 – 200 psig, with a sufficient volumetric flow rate for dislodging solids from the interior of the screen and into the trough beneath. The pressure or pressures in the high pressure segment usually average at least about 1.5 times and preferably at least about 2 times the pressure or pressures in the low pressure segment.

In every rotary screen filter, including those of the prior art, there is a certain variation in the percentage of dislodged solids which actually enter the trough as opposed to missing the trough or running down the interior of the drum and falling into the unfiltered sewage. At a given spray pressure, this percentage appears to be influenced positively by larger and/or more numerous screen openings and by the presence of protrusions which tend to break the water film on the inner surface of the screen. Correspondingly, with smaller screen openings (and smooth inner screen surfaces) it is recommended that pressures in excess of the above minima be employed in one or both of the pressure ranges, but especially the low pressure range.

The cycles vary in length from a fraction of an hour up to about one day or more. Within each cycle, the time is apportioned predominantly or exclusively between high and low pressure operating time. The high pressure segment of each cycle is at least as long as is required for at least about one, and preferably at least about three complete revolutions of the filter drum. The high pressure segment may represent from about 0.5% to about 33%, but more preferably 25% or less of the total time in each cycle. Generally, the balance of the time in each cycle will comprise the low pressure segment of the cycle, which is longer than the high pressure segment, and (optionally) a shorter but even lower (including zero) pressure operating segment for nozzle purging. Generally, the lower pressure nozzle-purging segment will represent less than 5% of the time in the cycle, and is preferably limited to only that time required to fully purge the nozzles, e.g. about 5 to 15 seconds.

The cycles are repeated substantially continuously throughout the continuance of filtration. Thus, over an extended period of filtration which may last one or more hours or days, the total length of the low and high pressure segments of the cycles which occur in such period may represent 100% and preferably represent at least 95% of the extended period. Thus, the nozzles remain "on" and spraying for extended periods under either high or low pressure at substantially all times during filtration, rather than rapidly pulsating on and off or rapidly pulsating between high and low pressure.

Operation of the process invention may be illustrated by an example wherein the system is designed to reduce suspended solids concentration from about 20 ppm to less than 10 ppm and is capable of handling a flow of about 700 gals. per minute of effluent from an activated sludge plant properly designed and operated in the treatment of that quantity of domestic sewage. A screen of about 5 ft. in diameter and 10 ft. long may be employed. This screen may be fitted with a cloth filter medium of any weave (but preferably an open weave such as square weave) of approximately 25 micron aperature and a projected open area of 20% of its total area. This screen, when operated at a peripheral speed of 90 ft/min., may be expected to pass the aforementioned flow with a nominal pressure drop across the media for example 6 inches of water head. The shower system can provide a low pressure of approximately 25 psi and a flow of 40 gallons/min. for approximately 27 minutes, and subsequently a period of a few seconds duration where the pump is stopped and the pressure drops to zero. This may be followed by a period wherein the pump is started and comes up to speed in the high pressure mode. During the stopping and starting phases the pressure in the spray header is at positive values of less than 15 psi for a finite period of time to accomplish flushing of the self cleaning nozzles.

Pressure in the shower pipe during the high pressure mode may be approximately 110 psi and flow thru the showers approximately 80 G.P.M. Duration of the high pressure mode may be about 3 minutes, after which period the motor is electrically switched to low speed to commence the low pressure mode of the sequence. The approximately 30-minute cycle as described above can be and normally is repeated, as described, on a continuous basis.

For applications in systems differing from the preceeding example, it is possible to preselect low pressures, high pressures, ratios of high to low pressure, ratios of high pressure time to low pressure time, and low and high pressure volumetric flows through the nozzles for varying drum diameters, lengths and speeds, for varying media apertures and open area ratios, and for effluents varying in the quality of their prior treatment, influent concentration of suspended solids, and dissolved contaminants.

For drums of increasing diameter, generally increased screen capacities are typically realized. However, the increased capacity is usually less than directly proportional to the increase in diameter. Under those circumstances somewhat higher pressures and flow rates can be selected in both low and high pressure segments, and vice versa. Where higher flows and pressures are selected the ratio of high pressure to low pressure and the ratio of time at high pressure to time at low pressure required may remain substantially the same.

When using screens longer in the longitudinal direction, one normally can obtain an increase in capacity which is typically proportional to the increase in length, when the flow rates of shower water at both high and low pressure are correspondingly increased. Thus, pressure and time requirements are normally substantially independent of screen length.

Starting at a low peripheral speed and gradually increasing same, one can readily determine an optimum speed which produces maximum filtration capacity. As the peripheral speed increases towards this optimum value, modest increases in the low pressure level and/or flow rate may be found helpful in obtaining best results. Further increases in drum speed beyond this optimum value may however result in a decrease in screen capacity.

Other things being equal, when one selects a filter medium with a larger aperture size one typically obtains increased screen capacity. However, such increase is apparently less than proportional to the increase in aperature size, providing the preponderance of particles in suspension are larger than the aperature selected. Both high and low pressure and/or flow rates may be somewhat reduced even if the ratio of high to low pressure and high pressure time to low pressure time remain the same.

When one selects a medium having an increased ratio of open area to total area increased, screen capacity may be obtained. This increase may in some instances approach proportionality with the increase in the open area ratio. Again, both high ad low pressure and/or flow rates may be somewhat reduced even if the ratio of high to low pressure and high pressure time to low pressure time remain the same.

The degree of treatment of the waste stream prior to screening or the concentration and type of suspended and dissolved materials it contains should be taken into account. A poorly treated influent to the screen may contain more dissolved and semi colloidal tenacious slime-forming contaminants that tend to foul the screen and may in turn require greater flow or pressure or time or a combination thereof, particularly in the high pressure phase of the cycle. Higher concentrations of solids generally indicate a need for somewhat higher low pressure flow or pressure or a combination thereof.

Operating the screen at increased differential head will generally result in increase in flow through the screen which is typically less than proportional to the increase in head. High and low pressure and flow requirements may be somewhat increased thereby. The ratio of time at high and low pressure need not necessarily be altered.

The variables of time on, pressure, and volume rate of the high pressure mode have an interrelationship within limits by which one can produce essentially the same degree of effectiveness of cleaning by making offsetting changes in some or all of these variables. For instance, during the high pressure segment illustrated in the example, the time on can be extended in connection with the use of either lower pressure or lower volume rate. The time on can be shortened somewhat at either high pressure or volume rate.

By way of illustrating the actual operation of a particular embodiment in accordance with this invention, and once again with reference to FIGS. 1–8, the process is initiated by pumping liquid containing solids to be filtered into inlet 51 (FIG. 5) through divider-overflow channel 53 which connects with conduit 11 and thus fills drum 13 to a level as indicated in FIGS. 4 and 6.

The filtration process is then initiated by conventional switch means which start motor 33 (FIGS. 1 and 2) turning gears 37 and 39 to produce the desired peripheral speed of drum 13.

At a given flow, peripheral speed, type and concentration of suspended material in the influent, substantially constant level is inherently maintained within drum 13 and an excellent and efficient flow of purified liquid may be filtered from the drum via weir 45, spill tank 47 and conduit 49 (FIGS. 1 and 4) to further processing or to disposal. On the other hand, it is also contemplated by this invention (although it is not expressly illustrated) that conventional pressure sensing means can optionally be provided both within reservoir 3 and drum 13 so as to measure differential pressure therebetween, and should such a differential depart from a prescribed value, either slow down or speed up the drum so as to decrease or increase the filtration rate to reestablish the prescribed pressure difference.

As can be seen best by way of reference FIGS. 1 and 4, as filter drum 13 rotates in the direction of the arrow, it lifts the solids 80 on filter screen 43. Water then filters through the screen and runs down the outside of the screen into tank 3. The solids 80 adhering to the inside of screen 43 are caused to approach the apex of rotation X by further rotation of screen 43. At point X, fluid pumped via pump 27 (FIG. 2) from tank 3 via conduits 29 and 23 to nozzles 25 is caused to impinge upon the solids layer, dislodging it from the screen downwardly into sludge collector 15.

The purified water collected in tank 3 fills to a level slightly above weir 45 and thus spills thereover for outlet purposes. On the other hand, the spray flush water, kept to a minimum in accordance with the teachings in this invention and mixed with the solids entering collector 15, are caused to flow downwardly through inclined trough 17 (see FIG. 3) and out conduit 19 to a sludge collection tank.

During this operation, timer means 65 has been operating in accordance with a preselected schedule so as to provide the desired pressures in the desired sequence at nozzle 25 by varying the speed of pump 27.

As can be seen, the filtering systems of this invention can be employed for many purposes, the particularly preferred one, i.e. filtering water either from sewage or from partially treated sewage, being described hereinabove. Once given the above disclosure many other features, modifications, and improvements will become apparent to the skilled artisan. Thus, such other features, modifications, and improvements are considered to be a part of this invention and should be considered in construing the following claims:

We claim:

1. In the process of separating a liquid from solids in an admixture of the two by using an internal rotary filter system comprised of a rotatable hollow drum defining therewithin a filter zone, said filter zone communicating with a liquid collection zone external to the drum through a filter medium located on the drum, and wherein separation is accomplished by presenting the admixture in the filter zone, rotating the drum, causing solids to adhere to the internal portion of the filter medium and causing liquid to flow through the filter medium and to said liquid collection zone, and wherein the separated solids are collected by contacting the filter medium with a fluid to dislodge the solids from the medium and cause them to collect in a solids collection zone separate from said liquid collection zone, an improved process for lessening the necessity for chemical cleaning and shut-down for cleaning, which process comprises contacting the filter medium with the fluid cycled at at least two different finite pressures including high pressure in the range of about 60 to about 200 psig and low pressure in the range of about 15 to about 60 psig, the duration of the high pressure segment of each cycle being equal to at least about the time required for one complete revolution of said drum, and representing from about 0.5% to about 33% of the total time in each cycle whereby the combination of time, pressures and interval of each within the cycle removes substantially all solids from the filter medium without overburdening the system with fluid.

2. A process according to claim 1 wherein said admixture is contaminated with filter-fouling ingredients and said combination of pressures and time interval are sufficient to prevent any substantial amount of fouling of said filter medium.

3. A process according to claim 1 wherein said fluid is obtained from the fluid collecting zone.

4. A process according to claim 3 wherein said fluid is sprayed through nozzles external of the drum and directed at an unsubmerged portion of the exterior of the drum, wherein said solids collecting zone includes collecting means located within the drum, below the said nozzles but above the level of liquid in said filter zone.

5. A process according to claim 4 wherein the admixture is sewage containing solids in a concentration sufficiently dilute for removal by microscreen treatment and the liquid collected in said collection zone contains less than 10 ppm solids.

6. A process according to claim 4 wherein the drum is rotated at a peripheral speed of at least about 30 feet per minute.

7. A process for separating a liquid and a solid from an admixture of the two which includes filter-fouling materials, by using apparatus including an inlet means for transmitting said admixture to a filter zone, a hollow rotatable drum means defining a filter zone therewithin, a liquid collection zone external to the drum means and communicating with the filter zone through a filter medium located on the drum, means for rotating the drum to thereby cause solids to adhere to the internal portion of the filter medium and to cause liquid to flow through the filter medium and to said liquid collection zone, shower means for applying fluid to the outer surface of said filter medium for backflushing said filter medium at a sufficient volumetric flow rate to dislodge the solids therefrom, supply means including a motor and pump means having an inlet connected with a source of filtered liquid and an outlet connected with said shower means, and solids collection means separated from said filter zone and said liquid collecting zone for collecting the dislodged solids, an improved process for lessening the necessity for chemical cleaning and shut-down for cleaning, which process comprises: applying the fluid in repeated cycles, which cycles include segments of operation at at least two different finite pressures, including high pressure in the range of about 60 to about 200 psig and low pressure in the range of about 15 to about 60 psig, said high pressure averaging at least about 1.5 times said low pressure; and apportioning said high and low pressure segments of each cycle for providing high pressure segments which are individually equal to at least about the time required for one complete revolution of said drum and which represents from about 0.5% to about 33% of the total time in each cycle; whereby the combination of time, pressures and interval of each within the repeated cycles effectively removes solids from the filter medium over extended periods of operation without overburdening the system with fluid.

8. A process according to claim 7 wherein said filter medium is filter cloth of interwoven strands or filaments defining aperatures therebetween.

9. A process according to claim 7, wherein said apparatus includes means for rotating said drum at a peripheral speed of at least about 30 feet per minute.

10. A process according to claim 7 wherein said source of filtered liquid is said liquid collection zone.

11. A process according to claim 7 wherein the high and low pressure segments are apportioned to provide operating cycles in the range of about 30 minutes to about 1 day.

12. A process according to claim 7 which includes applying high pressure averaging at least about 2 times said low pressure.

13. A process according to claim 7 including providing high pressure segments which are individually equal to at least about the time required for three complete revolutions of said drum.

14. A process according to claim 7 including providing high pressure segments which represent from about 0.5% to about 25% of the total time in each cycle.

15. A process according to claim 7 including operating said motor at at least two different speeds by high speed and low speed windings in said motor which can be electrically switched to change speeds.

16. A process according to claim 15 which includes energizing the high speed and low speed windings of said motor by timer means.

17. A process according to claim 16 which includes shutting off the pump means for an incremental period of time during the cycle by said timer means and employing as the shower means self-purging nozzle means which are located externally of the drum and which are capable of purging themselves of solids when said pump means are shut off.

18. A process according to claim 17 wherein said source of filtered liquid is said liquid collection zone.

19. Apparatus in accordance with claim 7 wherein said apportioning means is adapted for maintaining said pump in operation with said shower means spraying during 95% of each cycle.

20. A process for separating water and solids from an admixture which includes screenable suspended microbiological solids and tenaciously adherent filter fouling materials by using microscreening apparatus including an inlet means for transmitting said admixture to a filter zone, a hollow rotatable drum means defining a filter zone therewithin, a water collection zone external to the drum means and communicating with the filter zone through a filter medium loated on the drum, means for rotating the drum to thereby cause said solids to adhere to the internal portion of the filter medium and to cause water to flow through the filter medium and to said water collection zone, shower means for applying water to the outer surface of said filter medium for backflushing said filter medium at a sufficient volumetric flow rate to dislodge the solids therefrom, and solids collection means separated from said filter zone and said water collecting zone for collecting the dislodged solids, an improved process for lessening the necessity for chemical cleaning and shut-down for cleaning, which process comprises: applying the water through said shower means in repeated cycles, which cycles include segments of operation at at least two different finite pressures, including high pressure in the range of about 60 to about 200 psig and low pressure in the range of about 15 to about 60 psig, said high pressure averaging at least about 1.5 times said low pressure; and apportioning said high and low pressure segments of each cycle for providing high pressure segments which are individually equal to at least about the time required for one complete revolution of said drum and which represent from about 0.5% to about 33% of the total time in each cycle; whereby the combination of time, pressures and interval of each within the repeated cycles effectively removes solids from the filter medium over extended periods of operation without overburdening the system with water.

21. A process according to claim 20 wherein said filter medium is filter cloth of interwoven strands or filaments defining apertures in the range of 5 to 100 microns therebetween.

22. A process according to claim 21, wherein said apparatus includes means for rotating said drum at a peripheral speed of at least about 30 feet per minute.

23. A process according to claim 21 wherein the water for said shower means is drawn from the water collection zone.

24. A process according to claim 21 wherein the high and low pressure segments are apportioned to provide operating cycles in the range of about 30 minutes to about 1 day.

25. A process according to claim 21 which includes applying high pressure averaging at least about 2 times said low pressure.

26. A process according to claim 21 including providing high pressure segments which are individually equal to at least about the time required for three complete revolutions of said drum.

27. A process according to claim 21 including providing high pressure segments which represent from about 0.5% to about 25% of the total time in each cycle.

28. A process according to claim 20 in which said apparatus comprises supply means including a motor and pump means having an inlet connected with a source of water and an outlet connected with said shower means, and in which said motor is operated at at least two different speeds by high speed and low speed windings in said motor which can be electrically switched to change speeds for providing said high and low pressure segments.

29. A process according to claim 28 which includes energizing the high speed and low speed windings of said motor by timer means.

30. A process according to claim 29 which includes shutting off the pump means for an incremental period of time during the cycle by said timer means and employing as the shower means self-purging nozzle means which are located externally of the drum and which are capable of purging themselves of solids when said pump means are shut off.

31. A process according to claim 30 wherein filtered water for said shower means is drawn from said water collection zone.

32. Apparatus in accordance with claim 21 wherein said apportioning means is adapted for maintaining said pump in operation with said shower means spraying during 95% of each cycle.

* * * * *